United States Patent
Bodnar

(10) Patent No.: US 6,796,327 B2
(45) Date of Patent: Sep. 28, 2004

(54) CHECK VALVE WITH MULTIPLE DOORS

(75) Inventor: Bruce A. Bodnar, Tolland, CT (US)

(73) Assignee: BNL Industries, Inc., Vernon, CT (US)

( * ) Notice: Subject to any disclaimer, the term of this patent is extended or adjusted under 35 U.S.C. 154(b) by 114 days.

(21) Appl. No.: 10/253,553

(22) Filed: Sep. 24, 2002

(65) Prior Publication Data

US 2003/0089404 A1 May 15, 2003

Related U.S. Application Data

(60) Provisional application No. 60/348,117, filed on Nov. 9, 2001.

(51) Int. Cl.[7] .............................................. F16K 15/03
(52) U.S. Cl. ................................... 137/512.1; 137/527
(58) Field of Search ............................. 137/512.1, 527, 137/527.6, 527.8

(56) References Cited

U.S. PATENT DOCUMENTS

| | | | | |
|---|---|---|---|---|
| 1,603,123 A | * | 10/1926 | Kuehne | 137/527 |
| 1,673,831 A | * | 6/1928 | Kuehne | 137/527 |
| 2,157,554 A | * | 5/1939 | Mcfarlin | 137/512.1 |
| 2,831,499 A | * | 4/1958 | Myron | 137/512.1 |
| 2,856,956 A | * | 10/1958 | Smolensky | 137/512.1 |
| 2,976,882 A | * | 3/1961 | Cowan | 137/512.1 |
| 3,445,863 A | * | 5/1969 | Wada | 137/512.1 |
| 3,807,444 A | * | 4/1974 | Fortune | 137/512.1 |
| 4,078,268 A | * | 3/1978 | Possis | 137/512.1 |
| 4,605,041 A | | 8/1986 | Teumer | |
| 4,694,853 A | * | 9/1987 | Goodwin | 137/512.1 |
| 4,850,796 A | * | 7/1989 | Miller | 137/512.1 |
| 4,908,028 A | * | 3/1990 | Colon et al. | 137/512.1 |
| 5,222,519 A | * | 6/1993 | Sato et al. | 137/512.1 |
| 5,318,063 A | * | 6/1994 | Muddiman | 137/512.1 |
| 5,819,790 A | * | 10/1998 | Cooper | 137/512.1 |
| 6,173,739 B1 | * | 1/2001 | Addo et al. | 137/512.1 |

\* cited by examiner

*Primary Examiner*—John Rivell
(74) *Attorney, Agent, or Firm*—McCormick, Paulding & Huber LLP

(57) ABSTRACT

A check valve having a faceplate and an insert assembly. The faceplate and insert assembly have a stepwise cross-section in the direction of a forward fluid flow through the check valve. The stepwise cross-section is designed for placement of the faceplate and insert into a complementary shaped valve body. The faceplate defines at least two sections through which the fluid flowing through the check valve flows. The moving parts of the check valve, doors and hinges, are mounted on the insert such that the parts are not impacted by the fluid flow, thereby reducing maintenance on the check valve. Maintenance on the check valve can be accomplished by simply removing the faceplate, thereby releasing the insert assembly from the valve body so that the insert assembly can be replaced with minimum downtime to a cooling system having this check valve installed.

7 Claims, 2 Drawing Sheets

CHECK VALVE WITH MULTIPLE DOORS

CROSS-REFERENCE TO OTHER APPLICATIONS

This application claims priority to U.S. Provisional Application No. 60/348,117 entitled "Flow Sensitive Check Valve for the Handling of Dirty Fluids," filed Nov. 9, 2001, the entire disclosure of which is incorporated herein by reference.

FIELD OF THE INVENTION

The invention generally relates to flow control devices and more specifically to a check valve that allows a fluid to flow in a forward direction and prevents the fluid from flowing in a reverse direction.

BACKGROUND OF THE INVENTION

A check valve is a one way flow device. When in an open position, a fluid passes through the check valve in a forward direction and when in a closed position the fluid is prevented from passing back therethrough in a reverse direction. Check valves are used in numerous fluid systems. One particular fluid system is a cooling loop of a heat exchanger in the cooling line of a nuclear power plant.

Check valves are generally mechanical devices that are self actuated from an open position to a closed position, by the flow of the fluid itself. When the fluid is flowing in the forward direction, the force of the fluid acts upon one or more components of the check valve such that the components are held in an open position permitting the fluid to pass through the check valve. When the fluid flow is in the reverse direction, the fluid acts on these components to close the check valve.

The fluid flowing within the cooling loop of a nuclear power plant is generally water diverted from a river or lake. Consequently, the water contains contaminates in the form of suspended solid particles. The water also has a high flow rate to meet the cooling demands of the nuclear power plant. The water and suspended particles combine to abrade both the valve components that are held in an open position by the water passing through the check valve as well as other surfaces of the check valve, such as those that define the passage, or passages.

The abrasion results in wear and tear on the valve that eventually causes the check valve to fail, permitting a reverse flow of at least some fluid through the check valve. When a reverse flow of any magnitude occurs, maintenance must be performed on the check valve. Maintenance generally involves the replacement of the check valve, which can be expensive both in labor and parts.

Based on the foregoing, it is an object of this invention to provide a check valve that is less susceptible to wear and tear so that the check valve requires less maintenance and/or less frequent maintenance.

It is a further object of this invention to provide a check valve that has components that are easily replaceable, such that the whole check valve does not have to be replaced due to the failure of a component part.

SUMMARY OF THE INVENTION

The invention is directed in one aspect to a check valve having a faceplate that defines a faceplate opening and the faceplate has an opening perimeter. The use of the relative terms reverse or forward, herein, are based on the forward flow of a fluid through the check valve. At least one rib is positioned within the faceplate opening dividing the faceplate opening into at least two opening sections. Each section has a continuous section perimeter with a portion thereof being coincident with a portion of a faceplate-opening perimeter.

This check valve also has an insert assembly having a base and a plurality of doors. The base has a forward surface and a reverse surface and defines a base opening. The base opening has a base perimeter. The forward surface of the base contacts the reverse surface of the faceplate. The insert has one door for each opening section of the faceplate. Each door has a forward face and is hingeably coupled to the base adjacent the base perimeter. The forward face of each door is contoured to engage the reverse surface of the faceplate and the reverse face of the rib that defines the opening section to be closed by the door. Seals are provided on the reverse faces of the faceplate and ribs at least in the areas acted upon by the doors.

As indicated above, each door is hingeably coupled to the base adjacent the base perimeter. This placement permits the doors to swing outwardly, away from the fluid flowing in the forward direction through the check valve. The hinges can also be positioned behind the faceplate. More specifically, the faceplate opening has a cross-section that is smaller than the base opening. Consequently, there is a lip formed by a portion of the reverse face of the faceplate. The hinges are placed behind the lip such that fluid can flow through the faceplate opening and the base opening without directly impacting the hinges. The hinges are thus protected from direct contact with the fluid and any solids suspended therein leading to a reduction in wear and tear on the hinges.

The faceplate and the base of the insert each have a cross-section with the cross-section of the faceplate being greater than the cross-section of the base creating a stepwise cross-section of the check valve in the forward direction. The stepwise cross-section defines a seat in the reverse surface of the faceplate. The base fits into a complementary shaped valve body and rests on a seat therein. The base is secured in the valve body by the faceplate, which is temporarily attached to the valve body. This permits easy replacement of the faceplate, insert, or both with reuse of the valve body.

DETAILED DESCRIPTION OF THE PREFERRED EMBODIMENT OF THE INVENTION

Figure 1:
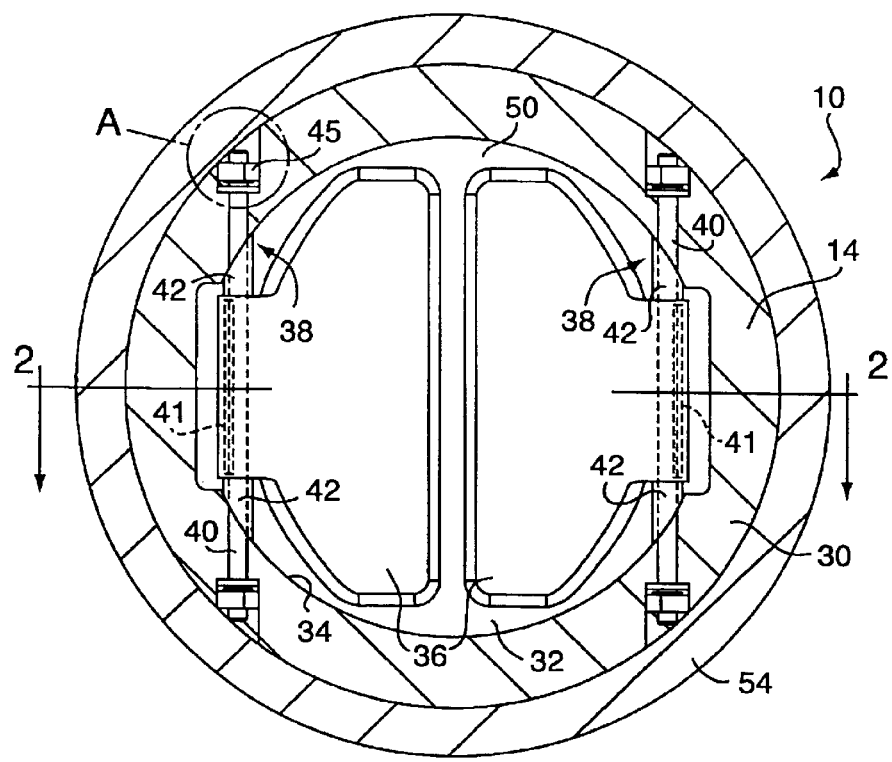
FIG. 1 is a rear view of the present invention viewed in the reverse flow direction with the doors in a closed position.
Figure 2:
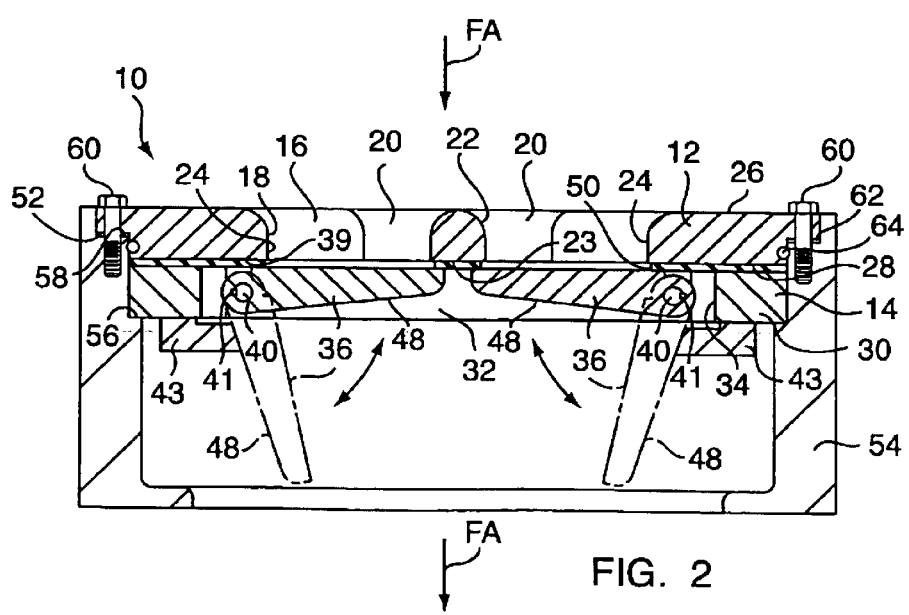
FIG. 2 is a cross-sectional, side view of FIG. 1 taken along line 2—2.
Figure 3:
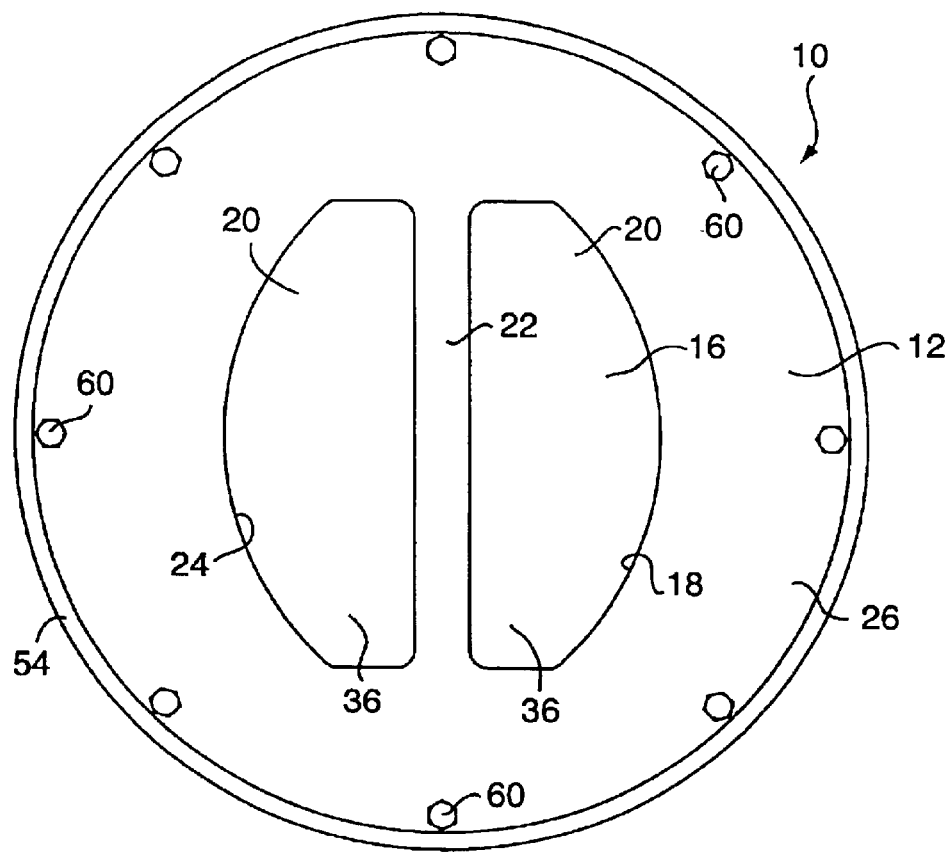
FIG. 3 is a front view of the present invention viewed in the forward flow direction.

Referring to FIGS. 1, 2 and 3, the check valve, generally referred to by reference number 10, is comprised of a faceplate 12 and an insert 14. The faceplate 12 defines a faceplate opening 16 that has a faceplate perimeter 18. The faceplate opening 16 is divided into at least two sections 20 by at least one rib 22, with each rib having a reverse surface 23. The relative terms "forward" and "reverse" as used herein are based on the forward flow of a fluid through the check valve denoted by flow arrow FA. Each section has a section perimeter 24 that is continuous, a portion of which is coincident with the faceplate opening perimeter 18. The faceplate has a forward side 26 and a reverse side 28.

The insert 14 comprises a base 30 defining a base opening 32 having a base perimeter 34. At least two doors 36 are hingeably connected to the base 30, one door for each section 20. Each door 36 is connected to the base 30 by a hinge 38 that is positioned about the base perimeter 34, thereby permitting the doors to open away from each other when the doors are moved from a closed position to an open position. In FIG. 2, the doors 36 are shown in the closed positions, with the open position of the doors 36 being illustrated by dotted lines. The doors contact the reverse side 28 of the faceplate 12 and reverse surface 23 of the rib 23 when in the closed position.

The hinges 38 are placed behind, based on a forward fluid flow, a lip 39 created by the relatively smaller cross-section of the faceplate opening 16 compared to the cross-section of the base opening 32. By placing the hinges 38 about the base perimeter 34 and behind the lip 39, the hinges 38, and more particularly the moving parts thereof, are positioned outside a forward flow path of a fluid flowing through the sections 20 of the check valve 10. As such, wear and tear on the component parts of the hinges 38 from the fluid, or solids suspended therein, is greatly reduced.

Each hinge 38 is spring biased to favor positioning the doors in the closed position, thus it is the force of the fluid passing through the check valve 10 in the forward direction exerted on the doors that causes the door to open and remain open.

Figure 4:
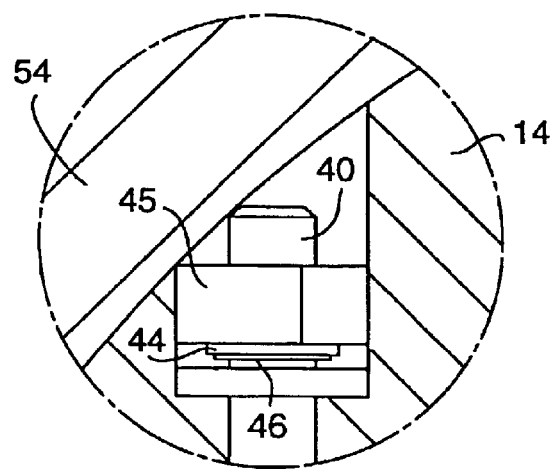
FIG. 4 is an expanded view of area A of FIG. 1.

Each hinge 38 is releasably coupled to the base 30 to permit easy removal of any door 36 and its associated hinge 38. As shown in FIGS. 1, 2 and 4, each hinge 38 includes a shaft 40 that is coupled to the door 36. The coupling includes a key 41 to prevent rotation of the door 36 about the shaft 40. Spacers 42, shown in FIG. 1, properly position the door 36 in relation to the section 20. The shaft 40 is journaled in bearings (not shown) that are positioned in the base 30. Finally, as shown in more detail in FIG. 4, each end of the shaft 40 is secured in position by a power spring 45, which rides on a thrust washer 44, which, in turn, rides on a snap ring 46.

This is but one example of a hinge design. Other designs are possible, therefore, the invention should not be considered so limited.

Attached to the base 30 are doorstops 43, as shown in FIG. 2. Each doorstop 40 restricts a door 36 from opening beyond perpendicular from the closed position (generally aligned with the direction of the forward flow of a fluid, see FA, through a section 20). As the door 36 in the maximum open position is always less than perpendicular to the closed position of the door 36, the door 36 will automatically close, assisted by the spring bias of the hinge 38, if the fluid flow reverses, by the reversing fluid impacting a reverse side 48 of the door 36. The positioning of the doorstops 43 on the insert 14 permits the doorstops to be replaced with the doors 36 by merely replacing the insert 14.

The faceplate 12 is positioned forward of the insert 14. Between the faceplate 12 and the insert 14 is a gasket 50. The gasket 50 extends onto the reverse surface 23 of the rib 22 to provide a seal for a door 36 in the area of the rib 22. This seal or gasket 50 is of the type having a metallic core, and an elastomeric covering.

The faceplate 12 has a cross-section that is greater than the cross-section of the insert 14 thereby defining a stepped cross-section in the forward direction with a step 52. As shown in FIG. 2, the stepped cross-section is designed to fit into a complementary shaped valve body 54 having a first step 56 and a second step 58 therein. When the insert 14 is placed within the valve body 54, it lands on the first step 56. The faceplate is then placed in the valve body 54 such that the step 52 lands on the second step 58. The faceplate 12 is then releasably secured to the valve body 54 by bolts 60. Additional gasketing is provided between the faceplate 12 and the valve body 54 by a flat gasket 62 and an o-ring 64.

Although the present invention has been described in considerable detail with reference to certain preferred versions thereof, other versions are possible. Specifically, a number of individual elements have been described which depending upon the manufacturing techniques employed may be an identifiable piece or consolidated with other pieces as a single unit. Therefore, the spirit and scope of the invention should not be limited to the description of the preferred versions contained herein.

What is claimed is:

1. A check valve for permitting a flow of a fluid in a forward direction and restricting the flow of the fluid in a reverse direction, the check valve comprising:

a faceplate including a forward surface and a reverse surface and defining a faceplate opening having a faceplate opening perimeter, at least one rib positioned within the faceplate opening such as to subdivide the faceplate opening into sections, each rib having a reverse face, each section having a continuous section perimeter with a portion thereof being coincident with a portion of the faceplate opening perimeter; and an insert assembly including a base having a forward and reverse surface and defining a base opening having a base perimeter, the forward surface of the base engaging the reverse surface of the faceplate; and a plurality of doors, one for each section, each door having a forward face and hingeably coupled to the base adjacent the base perimeter, the forward face contoured to engage the reverse surface of the faceplate and reverse face of the rib.

2. The check valve of claim 1, further comprising:

a valve body having a passageway for the flow of the fluid, the passageway having a stepped cross-section; and wherein the faceplate defines a stepped cross-section having a complementary shape to the stepped valve body that decreases in the forward flow direction such that the cross-section at the reverse surface of the faceplate is complementary to a cross-section of the base and the cross-section at the forward surface of the faceplate is greater than the base cross-section.

3. The check valve of claim 1 further including a seal positioned between the reverse surface of the faceplate and the forward surface of the base, and a seal positioned on the reverse surface of the ribs.

4. The check valve of claim 2 further including a seal that engages the reverse surface of the faceplate and an inner surface of the valve body.

5. The check valve of claim 1 wherein said faceplate opening is defined by a lip, and wherein the hingedly coupled doors each have a hinge positioned behind the lip.

6. The check valve of claim 1 further including a plurality of doorstops mounted to the reverse surface of the base, corresponding to the doors so that the doors are held in an open position generally aligned with the direction of fluid flow.

7. The check valve of claim 6, wherein each doorstop contacts a respective door to prevent said door from moving past a position beyond alignment with the fluid flow.

* * * * *